United States Patent [19]

Kasuga

[11] Patent Number: 4,652,534

[45] Date of Patent: Mar. 24, 1987

[54] HIGH-STRENGTH GLASS CERAMIC CONTAINING APATITE CRYSTALS AND A LARGE QUANTITY OF WOLLASTONITE CRYSTALS AND PROCESS FOR PRODUCING SAME

[75] Inventor: Toshihiro Kasuga, Tokyo, Japan

[73] Assignee: Hoya Corporation, Tokyo, Japan

[21] Appl. No.: 857,369

[22] Filed: Apr. 30, 1986

[30] Foreign Application Priority Data

Apr. 30, 1985 [JP] Japan .................................. 60-90886
May 8, 1985 [JP] Japan .................................. 60-95971

[51] Int. Cl.$^4$ ............................................. C03C 10/04
[52] U.S. Cl. ........................................ 501/5; 65/33; 433/201.1; 501/10; 623/18
[58] Field of Search .................. 501/5, 10; 65/33; 623/18; 433/201.1

[56] References Cited

U.S. PATENT DOCUMENTS

| | | | |
|---|---|---|---|
| 3,981,736 | 9/1976 | Broemer et al. | 501/10 |
| 4,120,730 | 10/1978 | Trojer et al. | 501/5 |
| 4,366,253 | 12/1982 | Yagi | 501/10 |
| 4,417,912 | 11/1983 | Abe | 501/10 |
| 4,560,666 | 12/1985 | Yoshida et al. | 501/5 |

FOREIGN PATENT DOCUMENTS

2209475 11/1972 Fed. Rep. of Germany .......... 501/5
57-191252 11/1982 Japan .

Primary Examiner—Helen M. McCarthy
Attorney, Agent, or Firm—Cushman, Darby & Cushman

[57] ABSTRACT

Glass ceramic comprising apatite crystals and at least 50% by weight of wollastonite crystals and a process for producing the same are disclosed. The glass ceramic contains from 45 to 56% by weight of CaO, from 1 to less than 10% by weight of $P_2O_5$, from 30 to 50% by weight of $SiO_2$, from 0 to 5% by weight in total of one or two of MgO and $Y_2O_3$, and from 0 to 5% by weight of one or more of $F_2$, $Na_2O$, $K_2O$, $Li_2O$, $Al_2O_3$, $TiO_2$, $ZrO_2$, SrO, $Nb_2O_5$ and $Ta_2O_5$, with the total content of CaO, $P_2O_5$ and $SiO_2$ being at least 90% by weight. The glass ceramic exhibits excellent biocompatibility and has improved strength.

7 Claims, No Drawings

HIGH-STRENGTH GLASS CERAMIC CONTAINING APATITE CRYSTALS AND A LARGE QUANTITY OF WOLLASTONITE CRYSTALS AND PROCESS FOR PRODUCING SAME

FIELD OF THE INVENTION

This invention relates to high-strength glass ceramic useful as an implant material for artificial dental roots, artificial bone, etc. More particularly, it relates to high-strength glass ceramic containing apatite crystals and a large quantity of wollastonite crystals, and to a process for producing the same.

BACKGROUND OF THE INVENTION

Conventionally known bioactive ceramics capable of chemically bonding to bone include sintered apatite and $Na_2O$—$K_2O$—$MaO$—$CaO$—$SiO_2$—$P_2O_5$ glass ceramic, as described in M. Akao et al, *J. Mater. Sci.*, 16, 809 (1981), G. DeWith et al, *J. Mater. Sci.*, 16, 1592 (1981), B. A. Blencke et al, *Med. Orthop. Tech.*, 95, 144 (1975), V. Strunz et al, *Dtsch. Zahnarztl. Z.*, 32, 287 (1977), and H. Brömer et al, *Science of Ceramics*, 9, 219 (1977). Further, glass ceramics containing apatite crystals and wollastonite crystals are also known, which is produced by grinding $MgO$—$CaO$—$P_2O_5$—$SiO_2$ type glass to 75 $\mu$m or smaller, molding the glass powder, heat-treating the glass powder at a sintering temperature and then at a temperature for forming an apatite crystal [$Ca_{10}(PO_4)_6(O_{0.5},F)_2$] and a wollastonite crystal [$CaSiO_3$], as described in Japanese Patent Application (OPI) No. 191252/82, T. Kokubo et al, *J. Mater. Sci.*, 20, 2001 (1985) and T. Kokubo et al, *Chikkyo*, 90, 151 (1982). In this glass ceramic, the apatite crystal contributes to biocompatibility and the wollastonite crystal contributes to mechanical strength. Hence, it is desirable to increase the wollastonite crystal content in order to enhance mechanical strength properties.

Bending strength of the sintered apatite is from 1,000 to 1,400 kg/cm$^2$; that of $Na_2O$—$K_2O$—$MgO$—$CaO$—$SiO_2$—$P_2O_5$ glass ceramic is from 1,000 to 1,500 kg/cm$^2$; and that of $MgO$—$CaO$—$P_2O_5$—$SiO_2$ type glass ceramic is from 1,200 to 1,400 kg/cm$^2$. However, this bending strength level is still unsatisfactory as artificial dental roots or artifical bone.

SUMMARY OF THE INVENTION

Accordingly, an object of this invention is to provide glass ceramic having excellent biocompatibility and improved strength over the conventional products and to provide a process for producing such high-strength glass ceramic.

That is, the present invention relates to glass ceramic comprising apatite crystals and a large quantity (at least 50% by weight) of wollastonite crystals, which contains $45 \leq CaO \leq 56$, $1 \leq P_2O_5 < 10$,
$30 \leq SiO_2 \leq 50$,
$0 \leq MgO + Y_2O_3 \leq 5$,
$0 \leq F_2 \leq 5$, $0 \leq Na_2O \leq 5$,
$0 \leq K_2O \leq 5$, $0 \leq Li_2O \leq 5$,
$0 \leq Al_2O_3 \leq 5$, $0 \leq TiO_2 \leq 5$,
$0 \leq ZrO_2 \leq 5$, $0 \leq SrO \leq 5$,
$0 \leq Nb_2O_5 \leq 5$, and $0 \leq Ta_2O_5 \leq 5$, wherein the total content of CaO, $P_2O_5$ and $SiO_2$ is at least 90% by weight.

The present invention also relates to a process for producing the above-described glass ceramic, which comprises molding a glass powder having the above-described composition and a particle size of not greater than 75 $\mu$m, heat-treating the glass powder at a sintering temperature therefor, and further heat-treating at a temperature for forming an apatite crystal and a wollastonite crystal.

DETAILED DESCRIPTION OF THE INVENTION

The quantitative limitation for the composition of the glass ceramic according to the present invention are set forth below.

If the CaO content is less than 45% by weight, sintering properties of the glass powder is extremely deteriorated so that high-strength glass ceramic cannot be obtained. If it exceeds 56% by weight, devitrification tendency becomes conspicuous. Accordingly, the CaO content is limited to a range of from 45 to 56% by weight and preferably from 45 to 50% by weight. With the $P_2O_5$ content of less than 1% by weight, devitrification tendency of glass is significant, and with the $P_2O_5$ content of 10 % or more, the amount of wollastonite to be precipitated is reduced. Accordingly, the $P_2O_5$ content is limited to a range of not less than 1% by weight and less than 10% by weight. When the $SiO_2$ content is less than 30% by weight, sintering properties of the glass powder is deteriorated and also the amount of wollastonite to be precipitated is reduced. On the other hand, the resulting glass tends to be devitrified if the $SiO_2$ content exceeds 50% by weight. Accordingly, the $SiO_2$ content is limited to a range of from 30 to 50% by weight and preferably from 40 to 50% by weight. The total content of CaO, $P_2O_5$ and $SiO_2$ is at least 90% by weight and preferably 95% by weight or more.

In addition to the above-described three essential components, the glass ceramic of the invention may optionally and rather preferably contain one or two of MgO and $Y_2O_3$ in a total amount of from 0 to 5% by weight. MgO and/or $Y_2O_3$ function(s) to inhibit precipitation of parawollastonite which causes reduction in strength of glass ceramic due to its tendency to rapidly grow in the course of the heat treatment. If the total content of MgO and $Y_2O_3$ exceed 5% by weight, however, the amounts of an apatite crystal and a wollastonite crystal are reduced. Accordingly, the upper limit of MgO and/or $Y_2O_3$ is 5% by weight. A preferred content of MgO and/or $Y_2O_3$ is from 0.5 to 5% by weight.

The glass ceramic in accordance with the present invention may further contain from 0 to 5% by weight of one or more of $F_2$, $Na_2O$, $K_2O$, $Li_2O$, $Al_2O_3$, $TiO_2$, $ZrO_2$, SrO, $Nb_2O_5$, which are harmless to human body. When the total amount of these optional components exceed 5% by weight, the amount of an apatite crystal and a wollastonite crystal to be precipitated may sometimes be decreased.

In the glass ceramic having the above-described composition according to the present invention, $\beta$-tricalcium phosphate crystal [$\beta$-$Ca_3(PO_4)_2$] may be present up to 20% by weight.

In the production of the glass ceramic of the present invention, it is necessary that the starting glass having the above-recited composition should be once ground to a particle size of 75 $\mu$m or smaller, molded in a desired shape and then sintered, followed by crystallization. If molten glass is directly molded into a prescribed shape, followed by heat treatment, the wollastonite crystal is precipitated only from the glass surface to produce glass ceramic having low mechanical strength with cracks in the interior thereof. Further, if the ground glass has a particle size greater than 75 μm, pores tend to remain in the resulting glass ceramic, thus failing to obtain glass ceramic having high mechanical strength. In other words, it is important for obtaining high-strength pore-free glass ceramic having uniform crystal distribution that the starting glass be finely ground to 75 μm or smaller, and preferably 45 μm or smaller.

In the process of the present invention, the glass powder of 75 μm or smaller is molded in a desired shape by a known means, and the molded article is heat-treated at a sintering temperature (generally from 700° to 900° C.) for the glass powder. The sintered glass is then subjected to heat treatment at a crystallization temperature (preferably from 850° to 1,200° C.) in which an apatite crystal and a wollastonite crystal are precipitated. The former heat treatment is important for obtaining glass ceramic with a small pore content and high mechanical stength, while the latter heat treatment is important for precipitation (formation) of an apatite crystal and a large quantity of a wollastonite crystal.

The sintering temperature for the glass powder can be determined by heating a glass powder molded article at a constant heating rate and measuring the heat shrinkage. It ranges from the temperature at which heat shrinkage starts to the temperature at which heat shrinkage comes to an end.

The crystallization temperature for apatite and wollastonite crystals can be determined by differential thermal analysis (DTA) of the glass powder. More specifically, a glass powder is heat-treated at a temperature of its exothermic peak of the DTA curve, and the precipitated crystal corresponding to the respective exothermic peak is identified by X-ray diffractometry. The crystallization temperature ranges from the temperature at which heat generation starts to the temperature at which heat generation comes to an end.

This invention will now be illustrated in greater detail with reference to the following examples, but is should be understood that they are not intended to limit the present invention.

EXAMPLE 1

Batches of glass each having the composition as shown in Table 1 were prepared from oxides, carbonates, phosphates, hydrates, fluorides, etc. as raw materials. Each bath was melted at 1,450° to 1,550° C. for 1 hour in a platinum crucible. The molten glass was poured into water for quenching, dried and then ground in a pot mill to obtain particles having a particle size of 75 μm or smaller. After 5% by weight of paraffin wax was added thereto as a binder, the glass powder was molded in a mold under a pressure of about 1,000 kg/cm².

The resulting molded article was placed in an electric furnace and heated at a constant heating rate of 3° C./min from room temperature up to the temperature indicated in Table 1, at which the molded article was maintained for 2 hours to effect sintering and crystallization. Thereafter, the product was allowed to cool to room temperature within the mold to obtain glass ceramic.

Scanning electron microscopy of a break surface of the resulting glass ceramic showed a fine microstructure with a small pore content in each case. X-ray diffractometry of ground glass ceramic demonstrated precipitation of apatite, α-wollastonite and β-wollastonite in every sample. Further, the glass ceramic was shaped in a round rod having a diameter of 4 to 5 mm by the use of a #300 diamond grinding stone, and the rod was subjected to three-point bending test. The results obtained are shown in Table 1.

As is apparent from Table 1, the glass ceramic in accordance with the present invention has a high bending strength of from 1,700 to 2,100 kg/cm².

TABLE 1

| Sample No. | Composition (wt %) | | | | | | | | | | | Heating Temperature (°C.) | Bending Strength (kg/cm²) |
| --- | --- | --- | --- | --- | --- | --- | --- | --- | --- | --- | --- | --- | --- |
| | CaO | P$_2$O$_5$ | SiO$_2$ | F$_2$ | K$_2$O | Al$_2$O$_3$ | TiO$_2$ | ZrO$_2$ | SrO | Nb$_2$O$_4$ | Ta$_2$O$_5$ | | |
| 1 | 49.5 | 6.5 | 44.0 | — | — | — | — | — | — | — | — | 1,100 | 2,000 |
| 2 | 49.3 | 8.5 | 42.0 | 0.2 | — | — | — | — | — | — | — | 1,150 | 1,700 |
| 3 | 49.3 | 6.5 | 44.0 | 0.2 | — | — | — | — | — | — | — | 1,150 | 2,100 |
| 4 | 49.3 | 5.0 | 45.5 | 0.2 | — | — | — | — | — | — | — | 1,150 | 2,000 |
| 5 | 49.3 | 3.0 | 47.5 | 0.2 | — | — | — | — | — | — | — | 1,000 | 1,900 |
| 6 | 48.2 | 2.1 | 49.5 | 0.2 | — | — | — | — | — | — | — | 900 | 1,800 |
| 7 | 55.5 | 6.3 | 38.0 | 0.2 | — | — | — | — | — | — | — | 1,100 | * |
| 8 | 49.3 | 1.0 | 49.5 | 0.2 | — | — | — | — | — | — | — | 900 | 1,700 |
| 9 | 47.9 | 6.3 | 42.6 | 0.2 | 3.0 | — | — | — | — | — | — | 1,150 | * |
| 10 | 48.3 | 6.3 | 43.2 | 0.2 | — | 2.0 | — | — | — | — | — | 1,150 | 1,900 |
| 11 | 48.3 | 6.3 | 43.2 | 0.2 | — | — | 2.0 | — | — | — | — | 1,150 | 2,000 |
| 12 | 47.4 | 6.3 | 42.1 | 0.2 | — | — | — | 4.0 | — | — | — | 1,150 | 2,000 |
| 13 | 48.3 | 6.3 | 43.2 | 0.2 | — | — | — | — | 2.0 | — | — | 1,150 | * |
| 14 | 48.3 | 6.3 | 43.2 | 0.2 | — | — | — | — | — | 2.0 | — | 1,150 | * |
| 15 | 48.3 | 6.3 | 43.2 | 0.2 | — | — | — | — | — | — | 2.0 | 1,150 | 1,800 |

*not measured

EXAMPLE 2

Glass ceramic was produced in the same manner as described in Example 1 but starting with glass batches having the composition as shown in Table 2 below.

Scanning electron microscopy of a break surface of the resulting glass ceramic showed a fine microstructure with a small pore content in each case. The glass ceramic was ground, and the precipitated crystal phase was identified by X-ray diffractometry. Further, the glass ceramic was subjected to three-point bending test in the same manner as in Example 1. The precipitated crystal phase identified and the results of strength test are shown in Table 2.

As is apparent from the results of Table 2, the glass ceramic in accordance with the present invention has a high bending strength of from 2,000 to 2,300 kg/cm$^2$.

TABLE 2

| Sample No. | Composition (wt %) | | | | | | | | | Heating Temperature (°C.) | Precipitated Crystal | Bending Strength (kg/cm$^2$) |
|---|---|---|---|---|---|---|---|---|---|---|---|---|
| | CaO | P$_2$O$_5$ | SiO$_2$ | MgO | Y$_2$O$_3$ | F$_2$ | ZrO$_2$ | Ta$_2$O$_5$ | K$_2$O | | | |
| 16 | 48.8 | 6.5 | 44.0 | 0.5 | — | 0.2 | — | — | — | 1,100 | AP* WO** | 2,100 |
| 17 | 47.8 | 6.5 | 44.0 | 1.5 | — | 0.2 | — | — | — | 1,150 | AP TR*** WO | 2,300 |
| 18 | 47.8 | 6.5 | 44.0 | 1.5 | — | 0.2 | — | — | — | 900 | AP WO | 2,000 |
| 19 | 45.3 | 6.5 | 44.0 | 4.0 | — | 0.2 | — | — | — | 1,150 | AP TR WO | 2,300 |
| 20 | 47.4 | 6.2 | 42.2 | — | 4.0 | 0.2 | — | — | — | 1,150 | AP WO | 2,000 |
| 21 | 47.4 | 6.2 | 42.2 | — | 2.0 | 0.2 | 2.0 | — | — | 1,150 | AP WO | 2,100 |
| 22 | 47.3 | 2.1 | 48.4 | 1.0 | 1.0 | 0.2 | — | — | — | 1,000 | AP WO | 2,000 |
| 23 | 53.9 | 3.0 | 40.9 | 2.0 | — | 0.2 | — | — | — | 1,000 | AP WO | not measured |
| 24 | 47.4 | 6.2 | 42.2 | 2.0 | — | 0.2 | — | 2.0 | — | 1,000 | AP WO | not measured |
| 25 | 45.5 | 8.5 | 41.8 | 2.0 | — | 0.2 | — | — | 2.0 | 1,150 | AP TR WO | not measured |

(Note)
*apatite
**wollastonite
***β-tricalcium-phosphate

While the invention has been described in detail and with reference to specific embodiments thereof, it will be apparent to one skilled in the art that various changes and modifications can be made therein without departing from the spirit and scope thereof.

What is claimed is:

1. High-strength glass ceramic having a bending strength from at least 1700 kg/cm$^2$ comprising apatite crystals and at least 50% by weight of wollastonite crystals, which consisting essentially of from 45 to 56% by weight of CaO, from 1 to less than 10% by weight of P$_2$O$_5$, from 30 to 50% by weight of SiO$_2$, from 0 to 5% by weight in total of one or two of MgO and Y$_2$O$_3$, and from 0 to 5% by weight of one or more of F$_2$, Na$_2$O, K$_2$O, Li$_2$O, Al$_2$O$_3$, TiO$_2$, ZrO$_2$, SrO, Nb$_2$O$_5$ and Ta$_2$O$_5$, with the total content of CaO, P$_2$O$_5$ and SiO$_2$ being at least 90% by weight.

2. High-strength glass ceramic as in claim 1, wherein MgO and/or Y$_2$O$_3$ is or are present in a total amount of from 0.5 to 5% by weight wherein beta-Ca$_3$(PO$_4$)$_2$ may be present up to 20% by weight.

3. High-strength glass ceramic as in claim 1, wherein the total content of CaO, P$_2$O$_5$ and SiO$_2$ is 95% by weight or more.

4. A process for producing high-strength glass ceramic having a bending strength from at least 1700 kg/cm$^2$, which comprises molding a glass powder having a particle size of 75 μm or smaller and consisting essentially of from 45 to 56% by weight of CaO, from 1 to less than 10% by weight of P$_2$O$_5$, from 30 to 50% by weight of SiO$_2$, from 0 to 5% by weight in total of one or two of MgO and Y$_2$O$_3$, and from 0 to 5% by weight of one or more of F$_2$, Na$_2$O, K$_2$O, Li$_2$O, Al$_2$O$_3$, TiO$_2$, ZrO$_2$, SrO, Nb$_2$O$_5$ and Ta$_2$O$_5$, with the total content of CaO, P$_2$O$_5$ and SiO$_2$ being at least 90% by weight, and heat-treating the glass powder at a sintering temperature for the glass powder and then at a temperature for forming apatite crystals and at least 50% by weight of wollastonite crystals.

5. A process as in claim 4, wherein there is present the glass powder MgO and/or Y$_2$O$_3$ in a total amount of from 0.5 to 5% by weight wherein beta-Ca$_3$(PO$_4$)$_2$ may be present up to 20% by weight.

6. A process as in claim 4, wherein the total content of CaO, P$_2$O$_5$ and SiO$_2$ is 95% by weight or more.

7. A process as in claim 4, wherein the temperature for forming apatite crystals and wollastonite crystals is from 850° to 1,200° C.

* * * * *